United States Patent [19]
Gillman et al.

[11] Patent Number: 4,600,376
[45] Date of Patent: Jul. 15, 1986

[54] DIFFERENTIAL PRESSURE MOLDING APPARATUS EMPLOYING RELEASABLE RESTRICTED AREA MOLDING CLAMP RINGS

[75] Inventors: Tommie D. Gillman, Gladwin; Dirk E. McKimmy, Beaverton, both of Mich.

[73] Assignee: John Brown Inc., Beaverton, Mich.

[21] Appl. No.: 744,731

[22] Filed: Jun. 14, 1985

[51] Int. Cl.$^4$ ............................................... A01J 21/00
[52] U.S. Cl. ..................................... 425/346; 425/388
[58] Field of Search ................ 425/162, 387.1, 388, 425/346, 397, 400, DIG. 48; 264/549–551

[56] References Cited

U.S. PATENT DOCUMENTS

| Re. 27,435 | 7/1972 | Shelby | 425/388 |
|---|---|---|---|
| 3,161,915 | 12/1965 | Thiel . | |
| 3,346,923 | 10/1967 | Brown et al. | 425/162 |
| 3,483,284 | 12/1969 | Shelby | 264/551 |
| 4,464,329 | 8/1984 | Whiteside et al. | 264/550 |

Primary Examiner—Willard E. Hoag
Attorney, Agent, or Firm—Learman & McCulloch

[57] ABSTRACT

A differential pressure molding apparatus comprising plural female mold cavity members and mating plug assist members, vacuum and pressure means for forming sheet material and clamping means to clamp said material, said clamping means having removable insert rings held in place by o-rings.

5 Claims, 4 Drawing Figures ns, wherein the rings are resiliently maintained in
DIFFERENTIAL PRESSURE MOLDING APPARATUS EMPLOYING RELEASABLE RESTRICTED AREA MOLDING CLAMP RINGS

BACKGROUND OF THE INVENTION

This invention relates to differential pressure forming equipment for forming articles such, as containers, in sheets of various thermoplastic materials such as polystyrene, polyethylene, and polypropylene. More particularly, the invention is concerned with certain improvements in restricted area clamp ring molding constructioaxial position on seats which have been provided for them, but may be readily removed therefrom. The invention is particularly of importance when a large number of mold cavities are provided in the female mold assembly; i.e., perhaps, as many as 280 cavities, when creamer cups are, for instance, being differential pressure formed. "Restricted area" molding is a technique which has been used in the art for some time, and is disclosed, for instance, in the present assignee's U.S. Pat. No. 3,600,753. The purpose of "restricted area" molding is to clamp individual areas of the plastic web around the female cavities such that the plug assists deform only the plastic areas within the rings, and the articles are formed substantially entirely from the plastic surfaces clamped by the rings, so that the necessary uniformity of wall thickness is achieved in the parts or articles being formed. Previously, clamp plates have been recessed to provide seats for such clamp rings in commercial machines, and the clamp rings have been bolted in position to project from the clamp plate. However, to our knowledge, no one has resiliently mounted the clamp rings in a manner which, inter alia, permits their ready release and removal in a manner which will now be described.

The present construction engenders numerous ancillary advantages which are important. For example, the clamp rings can be manufactured much more economically on an NC lathe, since milling, drilling and tapping operations have been completely eliminated. Moreover, the clamp rings are much easier to insert and remove than formerly. The construction, further, facilitates the transmission of vacuum forces to feed lug assist molding cavities provided in the clamp ring.

SUMMARY OF THE INVENTION

One of the prime objects of the invention is to provide a "restricted area" molding construction wherein the clamp rings surrounding the molding cavities, while firmly seated, may be peripherally spaced from the openings in which they are seated and resiliently held in position to facilitate their easy insertion and removal.

With the clamping pressures used, clamp rings of the type utilized for the small coffee creamer cups utilized in restaurants, for example, can be expected to occasionally require replacement when the machine is in service, and it is important that this be accomplished as rapidly as possible to minimize "down time".

A further object of the invention is to provide a construction which facilitates the use of differential pressure forces in the formation of feed lugs in the plastic sheet between the molded cups.

Still another object of the invention is to provide a construction which is reliable to efficiently function in the molding of the articles and adequately rugged to withstand the clamping forces which are involved; and, further, one which enables the molding apparatus to be more economically manufactured and marketed.

Other objects and advantages of the invention will become apparent by reference to the following specification and to the drawing.

IN THE DRAWINGS

Figure 1:
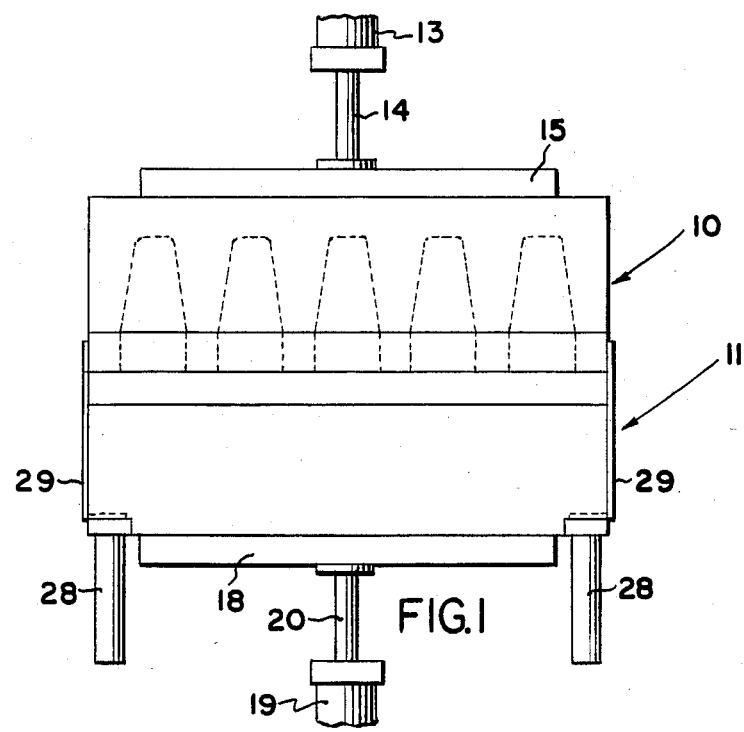
FIG. 1 is a side elevational view of the molding station in a differential pressure forming machine, with the opposed molds being shown in closed position.

Referring now more particularly to the accompanying drawings, the equipment includes, as usual, an upper female assembly, generally designated 10, mounted on a suitable differential pressure, forming machine frame of the type, for instance, illustrated in the present assignee's U.S. Pat. No. 3,346,923. Also mounted by the machine frame is a lower mold assembly, generally designated 11. As FIGS. 2 and 3 indicate, a plastic web or sheet, generally designated P, may be supported for indexing movement on conventional sheet advancing chain members 12 of the type shown, for instance, in U.S. Pat. No. 3,216,491, and it is to be understood that a new section of plastic sheet P is indexed between the molds 10 and 11, when the molds are in the separated position shown in FIG. 2, in the well known manner disclosed in the patents mentioned.

The upper mold assembly 10 may be moved vertically toward and away from the plastic sheet P by a suitable frame mounted, fluid pressure actuated cylinder 13, having a piston rod 14, connected with an upper platen 15. As in the mentioned U.S. Pat. No. 3,346,923, toggle linkage mechanism (not shown) may be provided to lock the mold assemblies in a fully closed position in which the plastic sheet P is firmly clamped therebetween with considerable pressure. The upper mold assembly, which will be only briefly described, because it is of a conventional nature, includes removable mold cavities 16 (FIG. 3) which are connected with a vacuum manifold 16a in the mold 10 by ports 17. At the proper time in the forming operation, the vacuum manifold 16a will be connected, via the usual valve, with a suitable vacuum pump to assist the movement of portions of the plastic web P into intimate engagement with the cavity walls 16.

The lower mold assembly 11, includes a lower platen which may be moved toward and away from the plastic sheet by a suitable, frame mounted, fluid pressure actuated cylinder 19, having a piston rod 20 connected to platen 18. A mold box 21 has side plate members 21a, fixed to platen 18, to support a plug assist mounting top plate 22, from which plug assists 23 project upwardly, as shown. The plate 22 may have threaded openings 22a, mounting threaded studs 24, which are received in threaded openings 25, provided in the plug assists 23. Provided in the plate 22 are ports 26, communicating with an air manifold 26a, which may be connected via a hose connection to a suitable source of air pressure, such as an air compressor. As will later become apparent, air is introduced to the ports 26 at the proper time, via the usual valve, during the forming operation to assist suction forces in moving the plastic sheet into intimate engagement with the cavity walls 16.

Figure 3:
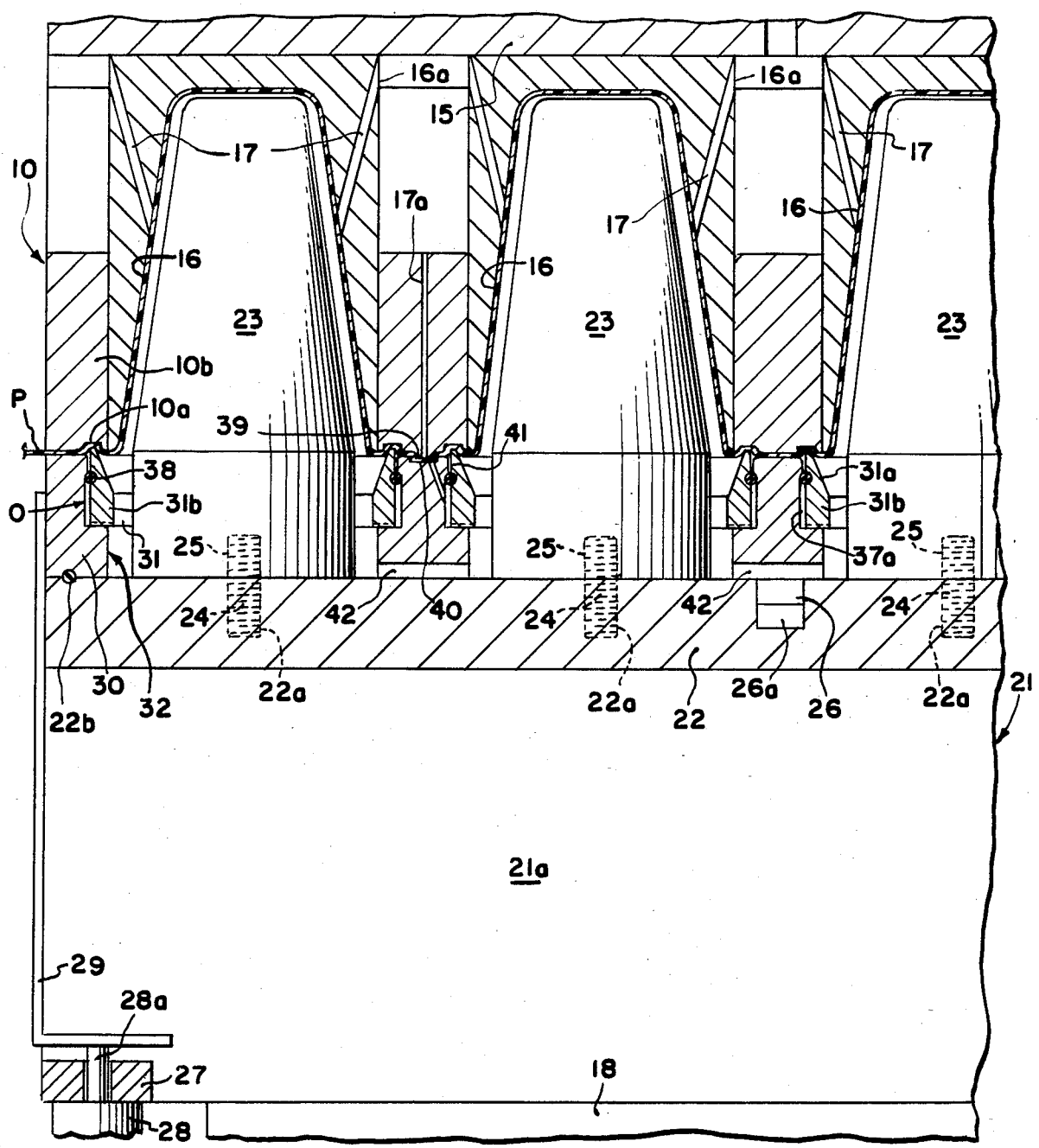
FIG. 3 is a similar, and still more enlarged, view showing the mold mechanisms in closed position.

Mounted on the side walls of the mold box 21, are cross pieces 27 to which air cylinders 28 may be fixed, as shown in FIG. 3. The cylinders 28 have piston rods 28a mounting angle-shaped bracket arms 29 which are fixed to and support a clamp ring support plate 30. A perimetral seal 22b may be carried by plate 22 to engage the plate 30 when the plates 22 and 30 are in the closed position illustrated in FIG. 3. As will become apparent, the plate 30 has enlarged openings, generally designated O, which are specially configured in a manner which presently will be described.

The openings O are in axial alignment with the mold cavities 16 which, of course, are in axial alignment with the plug assist 23. It is to be understood that, when the mold assembly 11 is moved to the plastic sheet P and the mold 10, which already has moved into engagement with the plastic sheet P, it will be the plate 30 which first engages the plastic sheet P. Thereafter, the plug assists 23 are moved upwardly into the position in which they are shown in FIG. 3. While suitable ports are not shown, it should be understood that the molds 10 and 11 are suitably water cooled by coolant fluid such as water at room temperature which may be pumped through flexible hose connections and suitable water passages in the mold units 10 and 11.

The construction described, thus far, is conventional in differential pressure forming equipment. The openings O are, however, uniquely configured to receive novel clamp rings 31 which are rigidly seated and yet resiliently held.

Figure 4:
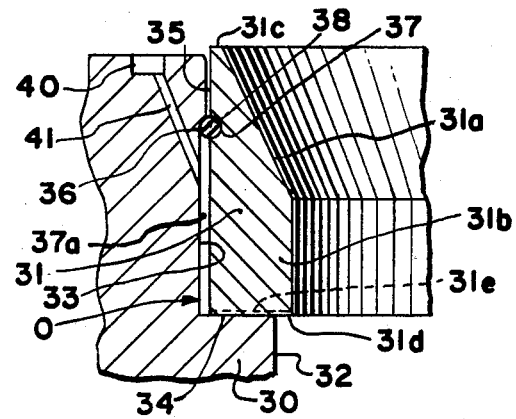
FIG. 4 is a still further enlarged, fragmentary, sectional, elevational view taken to particularly show the clamp ring configuration.

As FIG. 4 particularly indicates, each opening O includes a bore 32 of a size to freely pass the plug assist 23, which is axially aligned with it. Also provided is a counter bore 33, the configuration providing a radially extending seat 34 providing a firm backing or support for ring 31. At its upper end, opening O is reduced in diameter as at 35, and a curvilinear shoulder portion 36 connects the portions 33 and 35. Provided in each of the clamp rings 31 is a curvilinear, annular groove 37 to receive a resilient rubber O-ring 38, which as FIG. 4 indicates, projects radially in under the shoulder 36. Whereas ring 31 has sliding clearance with the marginal wall 35 of opening O, the construction provides a peripheral air space 37a surrounding ring 31, for a purpose which later will be described. It will be seen that ring 31 is configured with a beveled surface 31a, leading from a lower base portion 31b to a reduced size, upper end surface 31c which projects slightly upwardly beyond the plate 30 and is received in a recess 10a provided in the stripper assembly walls 10b of the upper mold 10. It is further to be noted that the base 31b of ring 31 is of sufficient thickness that it overhangs the marginal wall 32 of opening O as at 31d. Finally, spiral or other grooves 31e are cut in the lower surface of ring 31 to communicate air under pressure to the peripheral space 33 surrounding each ring 31. Provided in the plate 30, between each of the cavities 16 in the direction of travel of the sheet and between some of the cavities crosswisely of the sheet, are projecting plugs 39 which are aligned to mate with plug recesses 40 formed in the plate 30 between openings O. Vacuum ports 17a connect the plugs 39 with the source of vacuum in mold assembly 10 to tend to draw the plastic intimately against the projecting plugs 39. At the same time, air from the peripheral spaces 33 is communicated via ports 41 to assist in this portion of the molding operation. Provided in the rings 31 to communicate the ports 26 with the volumetric spaces surrounding plug assists 23, and with the grooves 31d and spaces 33, are recesses 42.

Figure 2:
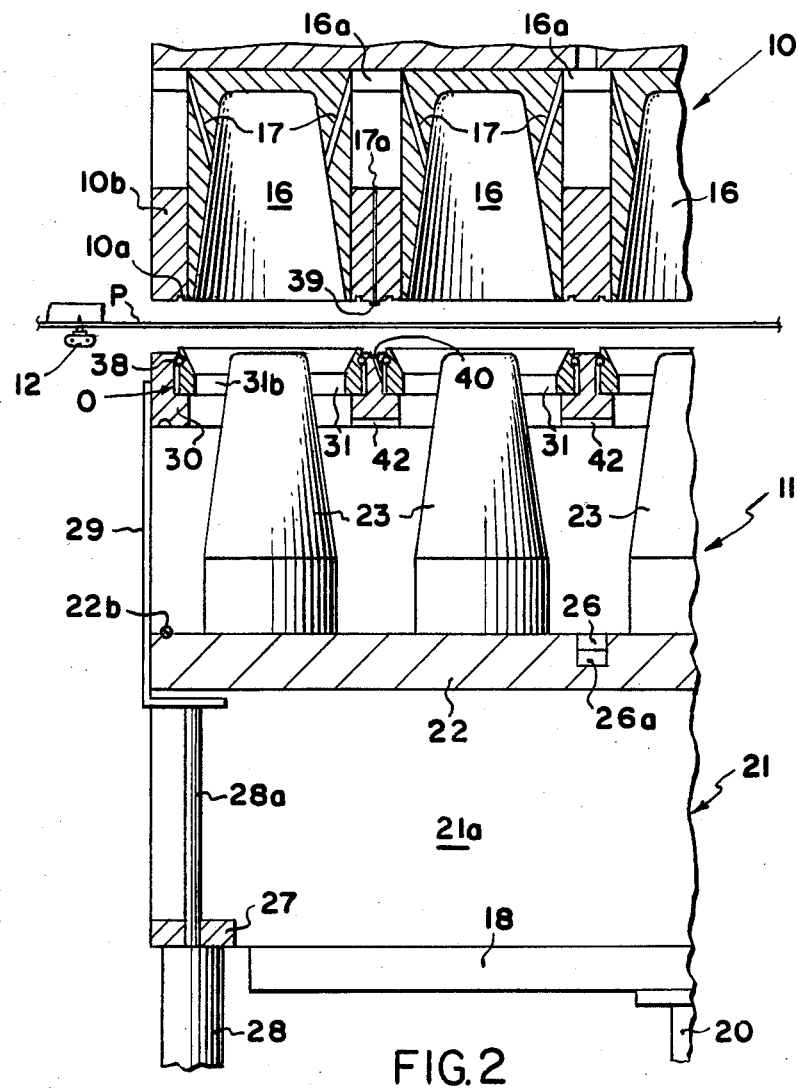
FIG. 2 is an enlarged, sectional, fragmentary, elevational view with the mold mechanism shown in separated position.

In operation, fluid pressure cylinder 13 is first operated to move the upper mold 10 to a position just above and adjacent to the heated plastic sheet P which has been heated in a downstream heating unit to a deformable molding temperature. At the same time, cylinder 19 moves the lower mold 11 upwardly until plate 30 engages the plastic sheet P, as shown in FIG. 2. It will be seen that the upper ends 31c of the rings 31 move the plastic sheet into the ring-receiving grooves 10a provided in the upper mold 10, while plugs 39 move the plastic web P into the recesses 40 provided in the plate 30. At this time, the continuous perimetral seal 22b seals the marginal edge of the mold assembly 11 in the usual manner. The cylinder 19 will continue to drive the lower mold assembly 11 upwardly while, clearly, further movement of the rings 31 is prevented. The plate 22 and the plug assists 23, however, continue to move upwardly to assume the FIG. 3 position, with considerable clamping pressure being exerted by the cylinders 28, which move with the air box 21 and plate 22. When the plug assists 23 reach raised position, the usual valve is operated to communicate a source of vacuum with the ports 17 and 17a, and air under pressure is released through ports 26 and 40. With the assistance of air under pressure via ports 31e, spaces 33 and ports 40, the vacuum drawn via passages 17a does a reliable job of forming the trim pressure indexing plugs x in the plastic sheet P. After a short time for cooling of the formed plastic articles in the mold cavities 16, the mold assemblies 10 and 11 are withdrawn by the cylinders 13 and 19, respectively, from the plastic sheet P. The conventional stripping walls 10b facilitate this withdrawal of the molds 10 and 11 to a position separated from the plastic sheet P and the articles formed therein. Thereafter, the plastic sheet P is indexed to remove the articles which have been formed from between the mold assemblies 10 and 11 and to insert a new section of the heated deformable plastic web P between the separated molds 10 and 11, after which the operation is repeated.

Any of the rings 31 may be readily removed and replaced via a tool which is inserted in opening O and exerts a force upwardly on the surface 31d capable of collapsing the resilient O-ring 38 sufficiently to permit the ring 31 to be pushed upwardly out of the opening O.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

What is claimed is:

1. Differential pressure molding apparatus for forming synthetic plastic parts in a plastic sheet, comprising:
 a. opposed mold assemblies, one being a female mold assembly having a plurality of mold cavities and the other comprising a plug assist support from which a plurality of plug assists, aligned with said cavities, project;
 b. means for supporting a deformable sheet of heated thermoplastic material in which parts are to be formed between said mold assemblies;
 c. means for relatively moving said mold assemblies from separated to closed positions on opposite sides of the sheet to cause said plug assists to enter said cavities and move portions of the plastic sheet into said cavities, and from closed to separated positions to relatively withdraw said plug assists;

d. a clamp plate mounted for relative movement with the plug assist support having a plurality of openings of a size to pass said plug assists in alignment with said cavities, radially extending seats surrounding said clamp plate openings and axially extending walls extending axially away from said seats to the edges of said openings;

e. generally cylindrical, removable clamp rings seated in said openings in the clamp plate on said seats;

f. deformable resilient means mounted on one of said axially extending walls and clamp rings, and radially projecting shoulder means on the other, in radially overlapping engagement to restrain axial movement of said rings away from said seats and releasably maintain the rings in axial position in said clamp plate openings such that the clamp rings project slightly axially beyond the clamp plate;

g. means for urging said clamp plate and said clamp rings in a direction toward said female mold assembly and plastic sheet, such that, when the mold assemblies are relatively moved toward closed position, the clamp rings engage the female mold assembly to clamp the plastic sheet in position around the mold cavities first of all, before the plug assists move the plastic up into the mold cavities with continued relative closing movement of the mold assemblies; and h. means for applying a differential pressure to opposite sides of the sheet to move the sheet finally into intimate engagement with the mold cavities when the mold assemblies have relatively moved to closed position.

2. Differential pressure molding apparatus for forming parts in a heated thermoplastic sheet, comprising:

a. a pair of opposed mold assemblies, one being a female mold assembly having a plurality of mold cavities and the other comprising a plug assist support from which a plurality of plug assists, aligned with said cavities, project;

b. means for supporting a deformable sheet of heated thermoplastic material in which parts are to be formed between said mold assemblies;

c. means for relatively moving said mold assemblies from separated to closed positions engaged with opposite sides of the sheet to cause said plug assists to enter said cavities and move portions of the plastic sheet into said cavities, and from closed to separated positions to relatively withdraw said plug assists;

d. a clamp plate, mounted for relative movement with the plug assist support, having a plurality of openings in alignment with said cavities of a size to pass said plug assists, said openings being enlarged interjacent their ends to provide radially extending seats and having axially extending marginal walls leading axially from said seats, with radially inwardly projecting shoulders on said walls spaced inwardly from the edges of said openings;

e. generally cylindrical, removable clamp rings seated in said openings in the clamp plate on said seats and mounting resilient O-rings which project radially outwardly from said rings inwardly of said shoulders and releasably maintain the rings in axial position in said clamp plate openings such that the clamp rings project slightly axially beyond the clamp ring plate;

f. means for urging said clamp ring plate and said clamp rings in a direction toward said female mold assembly and plastic sheet, such that, when the mold assemblies are relatively moved toward closed position, the clamp rings engage the female mold assembly to clamp the plastic sheet in position around the mold cavities first of all, before the plug assists move the plastic up into the mold cavities with continued relative closing movement of the mold assemblies; and g. means for applying a differential pressure to opposite sides of the sheet to move the sheet finally into intimate engagement with the mold cavities when the mold assemblies have relatively moved to closed position.

3. The apparatus of claim 2 wherein said rings are of such diameter relative to the marginal walls that perimetral spaces are provided around them; recesses are provided on said clamp plate between said rings to define sheet feed tab-forming cavities for forming tabs used in feeding the sheet through a trim press, in the sheet; ports communicate said spaces with the recesses; and means communicates differential pressure applying means with said spaces.

4. The apparatus of claim 2 wherein spiral grooves are provided on the ends of said rings which engage said seats, leading from the inner peripheries of the rings to said spaces.

5. The apparatus of claim 2 wherein said rings at their inner ends project radially inwardly of said seats.

* * * * *